United States Patent [19]

Koike

[11] Patent Number: 4,627,398
[45] Date of Patent: Dec. 9, 1986

[54] ELECTRONIC SPARK ADVANCE-TYPE IGNITION SYSTEM

[75] Inventor: Hiroshi Koike, Katsuta, Japan

[73] Assignee: Hitachi, Ltd., Tokyo, Japan

[21] Appl. No.: 675,862

[22] Filed: Nov. 28, 1984

[30] Foreign Application Priority Data

Nov. 30, 1983 [JP] Japan .............................. 58-224248

[51] Int. Cl.[4] ............................................ F02P 5/155
[52] U.S. Cl. .................................. 123/418; 123/427; 123/609
[58] Field of Search ................ 123/415, 418, 427, 609

[56] References Cited

U.S. PATENT DOCUMENTS 4,292,942 10/1981 Katada et al. ....................... 123/415
4,503,823 3/1985 Shibukawa et al. ................. 123/415

Primary Examiner—Andrew M. Dolinar
Attorney, Agent, or Firm—Antonelli, Terry & Wands

[57] ABSTRACT

In an ignition system of an electronic spark advance type including a pickup for generating a pair of position signals indicative of a maximum advance angle in terms of crankshaft rotation degrees for each crankshaft rotation, a signal generating circuit responsive to the output signals of the pickup to generate a pair of comparison signals of different levels within each of the crankshaft rotation degrees of the maximum advance angle and the other crankshaft rotation degrees and a control circuit for comparing the levels of each of the pairs of comparison signals to generate an energization starting position signal and an ignition position signal for respectively determining the energization and ignition timing of an ignition coil of an internal combustion engine, the control circuit generates the energization starting position signal prior to the timing of generation of earlier one of the next pair of position signals from the pickup and also generates the ignition position signal at a timing within the maximum advance angle thereby ensuring the required energization energy for the ignition coil even during the rapid acceleration of the engine speed.

5 Claims, 5 Drawing Figures

ELECTRONIC SPARK ADVANCE-TYPE IGNITION SYSTEM

The present invention relates to an electronic spark advance-type ignition system and more particularly to an electronic spark advance-type ignition system which is well suited for use as an ignition system for vehicles, e.g., automobiles.

Vehicles such as automobiles have heretofore used electronic spark advance-type ignition systems. As disclosed, for example, in the Automobile Techniques, Vol. 35, No. 2, 1981, Pages 198 to 202 etc., this type of known electronic spark advance-type ignition system determines an energization starting position of an ignition coil by a pair of pickup signals just preceding that pair of pickup signals which produce a spark. Thus, there is a disadvantage that if the speed of the engine is rapidly increased, during the rapid speed increase the energization starting position is determined by the result of the control before the rapid acceleration with the result that the dwell period of the ignition coil is decreased and the secondary voltage of the ignition coil becomes insufficient thus causing the engine to misfire.

The present invention has been made in view of the foregoing deficiencies in the prior art and it is an object of the invention to provide an electronic spark advance-type ignition system capable of preventing any shortage of energizing energy during the rapid acceleration.

The invention features an electronic spark advance-type ignition system comprising a magnetic pickup for generating a pair of position signals indicative of a maximum advance angle $W_1$ in terms of the degree of crankshaft rotation, a signal generating circuit responsive to the output signals of the pickup to generate a pair of comparison signals of different levels within the maximum advance angle indicative crankshaft rotation degrees and the other crankshaft rotation degrees, respectively, and a control circuit for comparing the levels of each of the two pairs of comparison signals to generate an energization starting position signal and an ignition position signal which determine the energization and ignition timing of the ignition coil, whereby the control circuit generates the energization starting position signal prior to the timing of generation of earlier one of the next pair of position signals from the pickup and also generates the ignition position signal at a timing within the maximum advance angle.

The above and other objects, features and advantages of the present invention will be more clear from the following description with reference to the accompanying drawings, in which.

Figure 1:
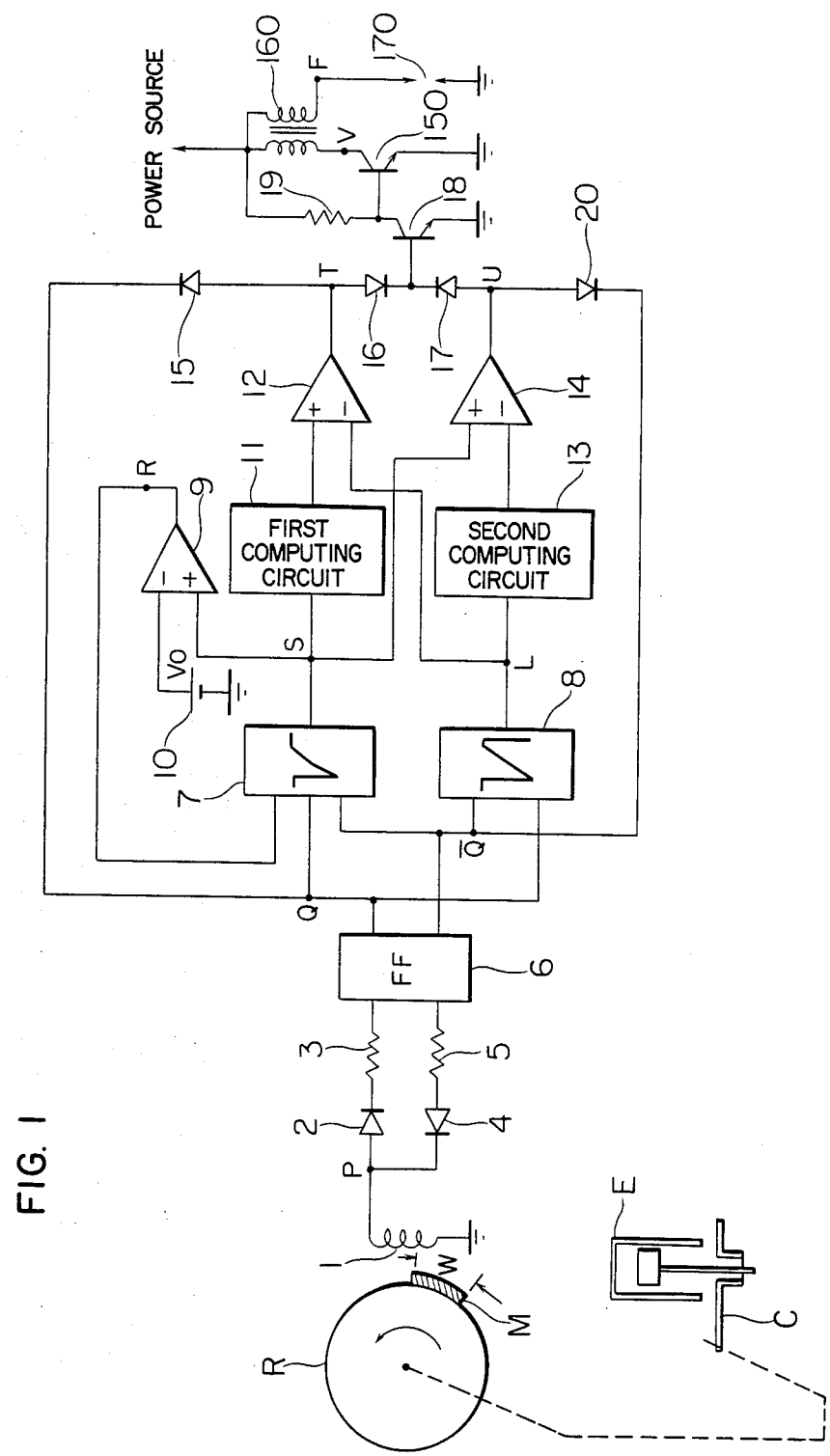
FIG. 1 is a block circuit diagram showing an embodiment of the invention.
Figure 2:
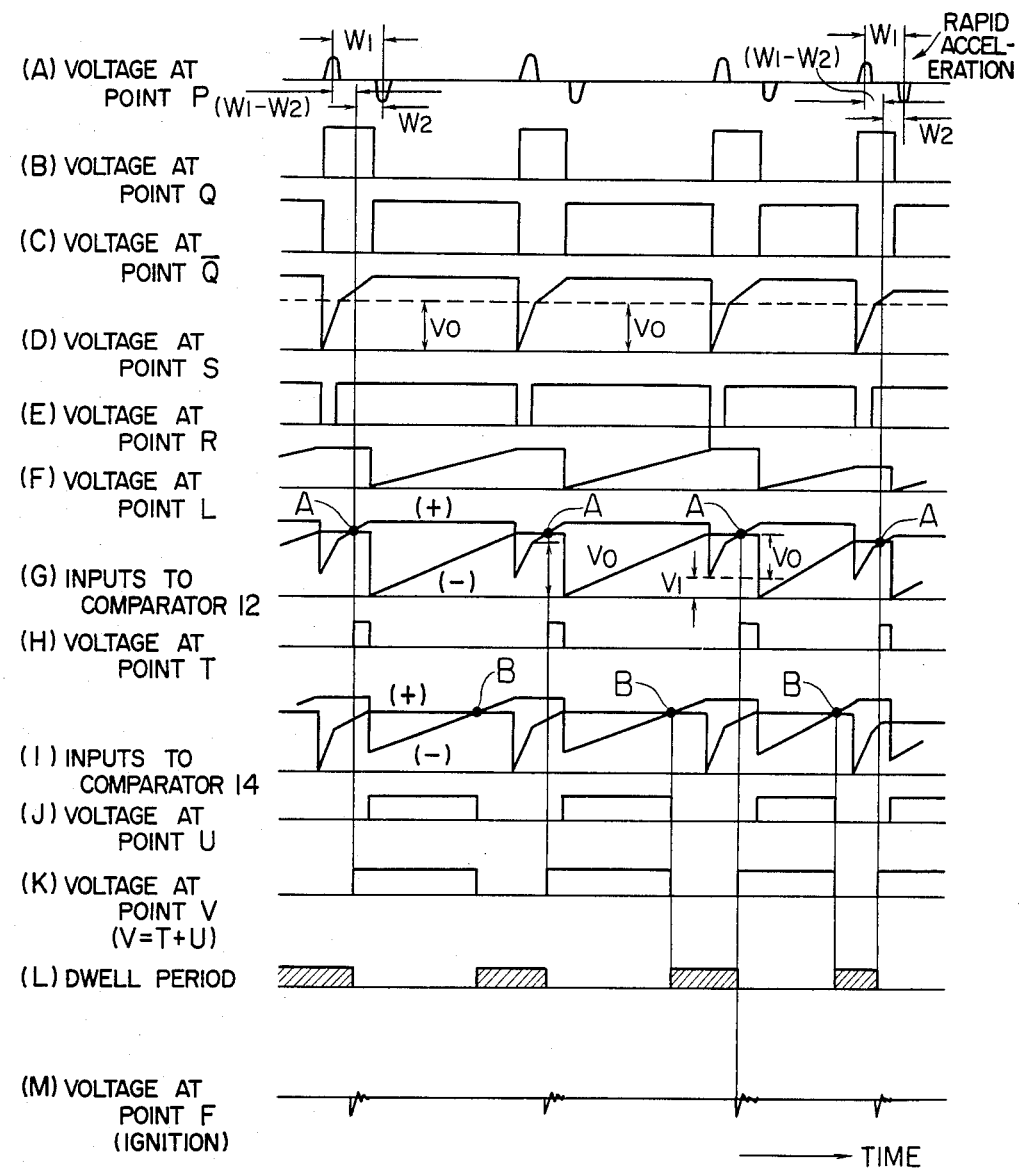
FIG. 2 is a waveform diagram showing the voltage waveforms at various points, dwell period and ignition timing of the embodiment shown in FIG. 1.

Referring to FIG. 1 showing an embodiment of the invention, a magnetic material M having a width W corresponding to the maximum advance angle is mounted on a reluctor R coupled to a crankshaft C of an internal combustion engine E for rotation therewith. When the magnetic material M passes, a pickup coil 1 generates a pair of angular position signals (FIG. 2(A)). As shown in FIG. 2(A), the interval between the pair of signals decreases with an increase in the engine speed. The interval between the pair of pulse signals is substantially equal to the maximum advance angle W. The output signals generated from the magnetic pickup 1 in this way are supplied to a flip-flop 6 through diodes 2 and 4 and resistors 3 and 5. In other words, the signals shown in (A) of FIG. 2 are generated from the pickup 1 with a time interval $W_1$ and the signals shown in (B) and (C) are generated from the flip-flop 6. The output signals of the flip-flop 6 are respectively supplied to sawtooth generating circuits 7 and 8. Numerals 9 and 10 denote a comparator and a reference voltage source respectively.

The sawtooth generating circuits 7 and 8 respectively generate the signals shown in (D) and (F) of FIG. 2.

The output signal S of the sawtooth generating circuit 7 is supplied to the non-inverting terminal of a comparator 12 through a first computing circuit 11. In the first computing circuit 11, the output signal of the sawtooth generating circuit 7 is subjected to multiplication by addition to adjust the level of the signal. The comparator 12 compares in level the output signal of the first computing circuit 11 and the output signal of the sawtooth generating circuit 8. In accordance with the result of the comparison the ignition position of an ignition coil 160 is determined. In other words, as shown in (G) of FIG. 2, the comparator 12 compares in signal level the output signal of the first computing circuit 11 and the output signal of the sawtooth generating circuit 8 so that the timing of generation of an ignition position signal for the ignition coil 160 is determined as shown in (H) and a spark plug 170 is fired at this timing.

The output signal L of the sawtooth generating circuit 8 is supplied to the inverting terminal of a comparator 14 through a second computing circuit 13 and it is compared with the output signal of the sawtooth generating circuit 7. The second computing circuit 13 performs the operation of multiplication by addition on the output signal L of the sawtooth generating circuit 8 so that the signal level of the signal L is adjusted and it is then applied to the comparator 14. The comparator 14 compares in level the output signal of the second computing circuit 13 and the output signal of the sawtooth generating circuit 7 as shown in (I) of FIG. 2 so that an energization starting position signal (the voltage at a point U) for determining the timing of energization of the ignition coil 160 is generated as shown in (J) of FIG. 2. In this way, the dwell period shown in (L) of FIG. 2 is obtained. As will be seen from the Figure, even during a rapid acceleration operation the desired energization energy is ensured and thus the ignition is effected accurately without misfiring as shown in (M) of FIG. 2.

On the other hand, a diode 15 functions so that the output of the comparator 12 other than the signal portion within the maximum advance angle is masked by the output Q of the flip-flop 6.

Also, diodes 16 and 17, a transistor 18 and a resistor 19 are arranged to perform the NOR operation on the outputs from the comparators 12 and 14. Also, a diode 20 returns to the output $\bar{Q}$ of the flip-flop 6 that portion of the output of the comparator 14 which corresponds to the signal width of the pickup 1.

Figure 3:
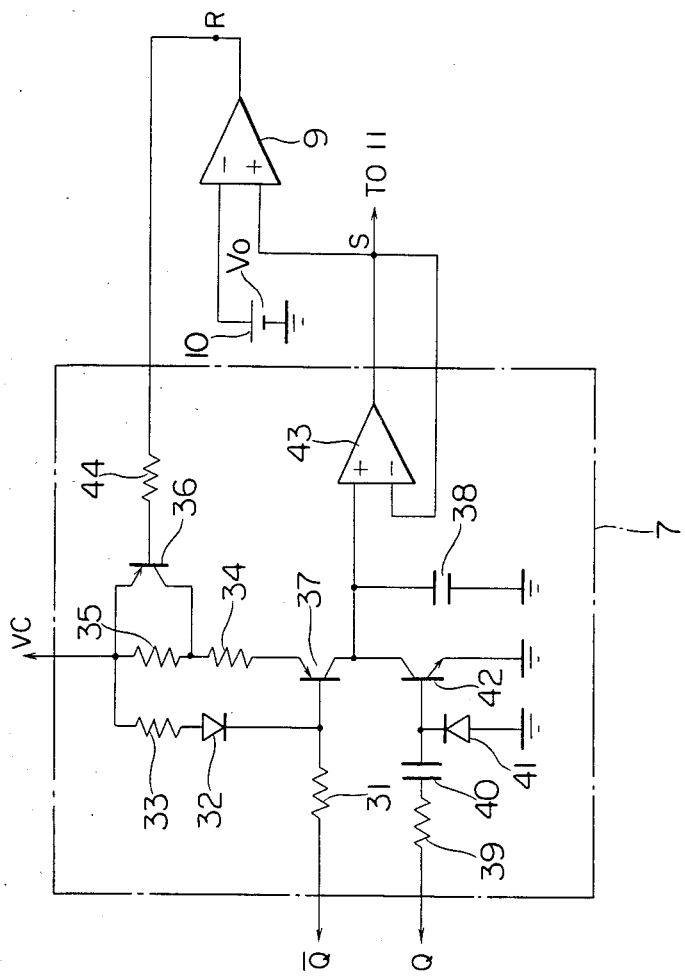
FIG. 3 is a circuit diagram showing a specific construction of the sawtooth generating circuit shown in FIG. 1.

Referring now to FIG. 3, there is illustrated a specific construction of the sawtooth generating circuit 7 and it will be described hereunder.

In the Figure, a current regulator circuit is formed by resistors 31, 33, 34, 35 and 44 a diode 32 and transistors 36 and 37 so that a constant current flows to the collector of the transistor 37 when the output $\overline{Q}$ of the flip-flop 6 goes to a low level. Then, when the constant current flows to the transistor 37, a capacitor 38 is charged. On the other hand, a resistor 39, a capacitor 40, a diode 41 and a transistor 42 form a differentiation circuit and a discharge circuit for the capacitor 38 so that when the output Q of the flip-flop 6 changes from the low level to a high level, the transistor 42 is turned on and the stored charge in the capacitor 38 is discharged.

The capacitor 38 is charged when the output $\overline{Q}$ of the flip-flop 6 goes to the low level and this capacitor level is maintained for a predetermined time after the output $\overline{Q}$ of the flip-flop 6 has gone to the high level. On the other hand, at the instant that the output $\overline{Q}$ of the flip-flop 6 goes to the low level and the output Q goes to the high level, the capacitor 38 is temporarily short-circuited to 0 volt. Then, the charging current is varied in response to the turning on and off of the transistor 36. When the potential at a point S is lower than a preset value $V_0$, the voltage at a point R goes to the low level and the transistor 36 is turned on. As a result, the charging current is increased and the sawtooth waveform of the point-S voltage has a steep slope. On the other hand, when the potential at the point S is higher than the preset value $V_0$, the transistor 36 is turned off so that the charging current is decreased and the slope of the sawtooth waveform is decreased thus taking the form of a sawtooth waveform which bends in the middle. Thus, by suitably selecting the resistance values of the resistors 34 and 35 in FIG. 3, it is possible to select any one of characteristic curves 1 to 3 shown in FIG. 4.

In a like manner, the voltage at a point L is increased when the output Q goes to the low level, assumes a predetermined value when the output Q goes to the high level and is short-circuited in response to the transition of the output $\overline{Q}$ from the low level to the high level, thereby generating a sawtooth waveform as shown in (F) of FIG. 2.

With the construction described above, the comparator 14 compares in level the waveform of the point-L voltage subjected to the multiplication by addition and the point-S voltage waveform and the desired energization starting position is determined in accordance with the intersection B of the waveforms. Also, the comparator 12 compares the level of the waveform of the point-S voltage subjected to the multiplication by addition and the level of the point-L voltage and the timing of generation of an ignition position is determined in accordance with the intersection A of the waveforms.

Figure 4:
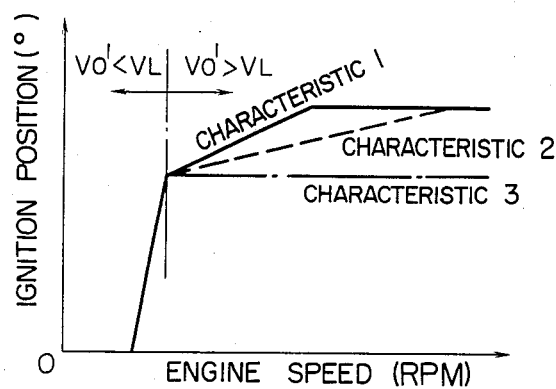
FIG. 4 is a characteristic diagram showing the relation between the engine speed and the ignition position in the system shown in FIG. 1.

Also, since the sawtooth waveform of the point-S voltage has a bend in the middle, the advance characteristic differs between the engine speed ranges where the point-L voltage is higher than a preset value $V_0'$ and where the point-L voltage is lower than the preset voltage $V_0'$ and therefore any of the different characteristics as shown in FIG. 4 can be obtained depending on the constants of the computing circuit 11. The voltage $V_0'$ is the sum of the voltage $V_0$ of FIG. 2(D) and the level-up voltage $V_1$ of FIG. 2(G). Namely, $V_0' = V_0 + V_1$. In other words, it is controlled so that the diode 20 functions to reduce the output of the comparator 14 to the low level during the time that the output $\overline{Q}$ of the flip-flop 6 is at the low level and the energization starting position (the point B of FIG. 2(I)) is prevented from appearing after earlier one of the next pair of position signals generated from the pickup 1.

Figure 5:
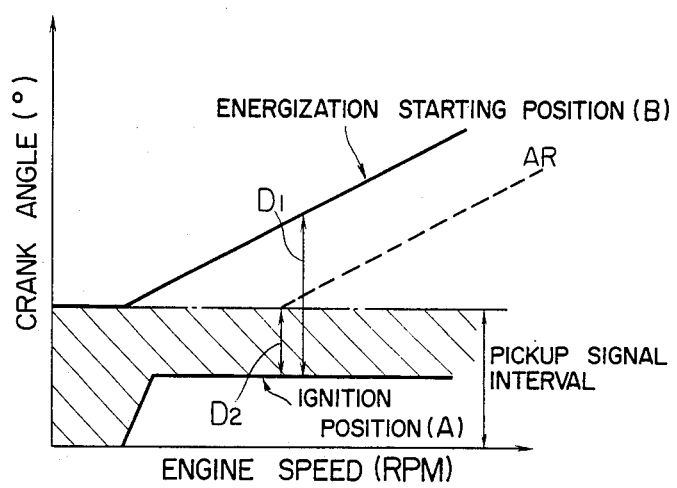
FIG. 5 is a characteristic diagram showing the ignition position and the energization starting position in terms of the relation between the engine speed and the crankshaft rotation degrees.

Also, the combination of the characteristic 3 of FIG. 4 and the characteristic by the diode 20 results in the relation between the energization starting position (the point B) and the ignition position (the position A) as shown in FIG. 5.

More specifically, in FIG. 5, the dwell period is an interval $D_1$ from the energization starting position to the ignition position. During the rapid acceleration of the engine, the straight line indicative of the energization starting position is shifted to a broken-line straight line AR indicative of the rapid acceleration energization starting position. Thus, during the rapid acceleration the straight line AR is lowered so that the interval between it and the ignition position is decreased as indicated at $D_2$ and the energization energy is decreased. The present invention features in presetting the maximum advance angle to a large value such that no misfire occurs even if the energization energy is decreased as mentioned previously. Thus, when the energization starting position is retarded by rapid acceleration, the dwell period becomes the interval of time between the earlier one of a pair of pickup signals generated from the pickup 1 and the ignition position even in the worst case. In the case of the conventional ignition system, however, the instance of the earlier one of a pair of pickup position signals is the same with the end of advance position so that during rapid acceleration the energization starting position is retarded to the position of the earlier one of the next pair of pickup signals generated from the pickup and therefore the dwell period is reduced to zero causing misfiring if the engine speed becomes so high that the ignition system advances the ignition timing to the maximum advance angle.

In accordance with the embodiment of the invention, however, there is a time interval between the earlier one of the next pair of position signals from the pickup 1 and the end of the advance ignition position so that if the engine is accelerated rapidly to a speed such that the energization starting position is retarded to the generation timing of the earlier one of the next pair of position signals from the pickup 1 and the ignition position is advanced to the maximum advance position, the dwell period corresponding to the time interval indicated by the hatching in FIG. 5 (corresponding to $D_2$) is always ensured and thus there is no danger of any misfiring due to the rapid acceleration.

From the foregoing description it will be seen that in accordance with the present invention the difference $(W_1 - W_2)$ (see FIG. 2) between the interval $W_1$ between a pair of position signals generated from the pickup and the time interval $W_2$ from the ignition position to one of the position signals generated thereafter is forcibly secured as the dwell period and therefore there is a remarkable effect that even if the engine speed is increased rapidly, it is possible to prevent the dwell period from being decreased excessively thus causing the engine to misfire due to the insufficient secondary voltage in the ignition coil.

The present invention is not restricted to the embodiments disclosed in this specification but all of the modifications included in the scope of invention indicated in the appended claims is included in the present invention.

What is claimed is:

1. An electronic spark advance-type ignition system for an internal combustion engine comprising:

an ignition coil;

a magnetic pickup for generating a pair of pulse signals with a time interval therebetween substantially corresponding to a maximum advance angle in terms of crankshaft rotation degrees for each rotation of a crankshaft of said engine;

signal generating means responsive to said pair of pulse signals from said pickup for generating a pair of comparison signals of different levels within each of the crankshaft rotation degrees of said maximum advance angle and the other crankshaft rotation degrees; and control means for comparing the signal levels of each of said pairs of comparison signals to generate an energization starting position signal and an ignition timing determining ignition position signal for said ignition coil, said signal generating means including means for controlling the waveform of one of said pair of comparison signals so that said ignition position signal is advanced in angle with respect to said energization starting position signal, whereby said energization starting position signal is generated under all conditions prior to the timing of generation of the earlier one of the next pair of pulse signals generated from said pickup and said ignition position signal is generated within said maximum advance angle at a point in time following generation of said earlier one of said next pair of pulse signals by at least a predetermined amount.

2. An ignition system according to claim 1, wherein said signal generating means comprises:

a first and a second sawtooth wave generating circuit;

a first computing circuit for operating on an output signal of said first sawtooth wave generating circuit;

a second computing circuit for operating on an output signal of said second sawtooth wave generating circuit; and means for decreasing the slope of the output signal of said first sawtooth wave generating circuit when that output signal reaches a predetermined level.

3. An ignition system according to claim 2, wherein said control means comprises:

a first comparator for comparing an output from said first computing circuit and the output from said second sawtooth generating circuit; and a second comparator for comparing an output from said second computing circuit and the output from said first sawtooth generating circuit.

4. An ignition system for an internal combustion engine comprising:

a pulser for producing positive and negative output pulses responsive to the rotation of the engine;

first sawtooth wave generator means for generating a sawtooth wave output signal in response to the positive output pulse of said pulser;

second sawtooth wave generator means for generating a sawtooth wave output signal in response to the negative output pulse of said pulser;

a first multiplier circuit multiplying the output signal of aid first sawtooth wave generator means by a constant to produce an output signal;

a second multiplier circuit multiplying the output signal of said second sawtooth wave generator means by a constant to produce an output signal;

first comparator means comparing the output signal of said first sawtooth wave generator means with the output signal of said second multiplier circuit to produce an output signal which controls the current conduction start position of ignition coil primary current; and second comparator means comparing the output signal of said second sawtooth wave generator means with the output signal of said first multiplier circuit to produce an output signal which controls the ignition position of the engine;

said first sawtooth wave generator means including signal control means for decreasing the slope of the sawtooth wave output signal thereof when that output signal reaches a predetermined level, whereby the ignition position output signal of said second comparator means is advanced in angle with respect to said current conduction start position signal.

5. An ignition system for an internal combustion engine as defined in claim 4, wherein said signal control means includes third comparator means for comparing the sawtooth wave output signal of said first sawtooth wave generator means to a predetermined reference voltage and for altering the slope of that sawtooth wave output signal when it is detected that said sawtooth wave output signal is no less than said reference voltage.

* * * * *